United States Patent
Ihm et al.

(10) Patent No.: US 7,733,840 B2
(45) Date of Patent: Jun. 8, 2010

(54) SUPPORTING HYBRID AUTOMATIC RETRANSMISSION REQUEST IN ORTHOGONAL FREQUENCY DIVISION MULTIPLEXING ACCESS RADIO ACCESS SYSTEM

(75) Inventors: Bin Chul Ihm, Anyang-si (KR); Chang Jae Lee, Cheonan-si (KR); Yong Suk Jin, Anyang-si (KR); Jin Young Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/566,615

(22) Filed: Sep. 24, 2009

(65) Prior Publication Data

US 2010/0017675 A1 Jan. 21, 2010

Related U.S. Application Data

(63) Continuation of application No. 11/319,305, filed on Dec. 27, 2005, now Pat. No. 7,693,125.

(30) Foreign Application Priority Data

| Dec. 27, 2004 | (KR) | ...................... 10-2004-0112930 |
| Jan. 10, 2005 | (KR) | ...................... 10-2005-0002246 |
| Jan. 20, 2005 | (KR) | ...................... 10-2005-0005337 |

(51) Int. Cl.
*H04J 1/00* (2006.01)
*H04B 7/02* (2006.01)
(52) U.S. Cl. ........................................ 370/343; 455/101
(58) Field of Classification Search ............... 370/310, 370/319, 343, 344; 455/101
See application file for complete search history.

(56) References Cited

U.S. PATENT DOCUMENTS

| 7,304,971 B2* | 12/2007 | Balachandran et al. ...... 370/337 |
| 7,339,949 B2* | 3/2008 | Suzuki et al. ............... 370/468 |
| 2004/0105386 A1* | 6/2004 | Sipola ..................... 370/230.1 |
| 2005/0117508 A1* | 6/2005 | Gaal ......................... 370/209 |
| 2007/0255993 A1* | 11/2007 | Yap et al. .................... 714/748 |

OTHER PUBLICATIONS

Haitao Zheng et al., "Multiple ARQ processes for MIMO systems", Sep. 15-18, 2002, Personal, Indoor and Mobile Radio Communications, 2002. The 13th IEEE International Symposium, vol. 3 pp. 1023-1026.*

* cited by examiner

*Primary Examiner*—Patrick N Edouard
*Assistant Examiner*—Michael T Thier
(74) *Attorney, Agent, or Firm*—Lee, Hong, Degerman, Kang & Waimey

(57) ABSTRACT

A method of supporting a hybrid automatic retransmission request (HARQ) in an orthogonal frequency division multiplexing access (OFDMA) radio access system is disclosed. Preferably, the method comprises receiving a downlink data frame comprising a data map information element and a data burst comprising a plurality of layers, wherein each layer is encoded with a corresponding channel encoder, and wherein the data map information element is configured to support multiple antennas to achieve space time transmit diversity by providing control information associated with each one of the plurality of layers, wherein the control information comprises allocation of acknowledgement status channels corresponding to the plurality of layers, and transmitting in an uplink data frame a plurality of acknowledgement status, each acknowledgement status being associated with whether a corresponding layer of the plurality of layers is properly decoded.

10 Claims, 15 Drawing Sheets

SUPPORTING HYBRID AUTOMATIC RETRANSMISSION REQUEST IN ORTHOGONAL FREQUENCY DIVISION MULTIPLEXING ACCESS RADIO ACCESS SYSTEM

CROSS-REFERENCE TO RELATED APPLICATIONS

This application is a continuation of U.S. application Ser. No. 11/319,305, filed on Dec. 27, 2005, now U.S. Pat. No. 7,693,125, issued Apr. 6, 2010, which pursuant to 35 U.S.C. §119(a), claims the benefit of earlier filing date and right of priority to Korean Application No. 10-2004-0112930, filed on Dec. 27, 2004, Korean Application No. 10-2005-0002246, filed on Jan. 10, 2005, and Korean Application No. 10-2005-0005337, filed on Jan. 20, 2005, the contents of which are hereby incorporated by reference herein in their entirety.

FIELD OF THE INVENTION

The present invention relates to an orthogonal frequency division multiplexing Access (OFDMA) radio access system, and more particularly, to supporting a hybrid automatic retransmission request (HARQ) in the OFDMA radio access system. Although the present invention is suitable for a wide scope of applications, it is particularly suitable for reducing overhead generated from the retransmission despite the non-existence of transmission error if a signal is transmitted via a plurality of antennas via the same uplink or downlink data burst when using a multi-antenna system in the OFDMA radio access system supporting the HARQ.

BACKGROUND OF THE INVENTION

Generally, an automatic repeat request (ARQ) is a response message notified by a receiving side to a transmitting side after receiving the data transmitted from the transmitting side. The ARQ informs the transmitting side whether the data was correctly received. Furthermore, the ARQ can be classified into three systems, as shown in FIGS. 1A to 1C, respectively.

FIG. 1A shows a 'stop-and-wait' ARQ system, in which a transmitting side waits after data transmission to receive an ACK or NACK message. The transmitting side then sends new data or retransmits former data.

FIG. 1B shows a 'go-back-N' ARQ system, in which a transmitting side continuously transmits data regardless of a response from a receiving side. After receiving a NACK signal, the transmitting side retransmits data from a corresponding portion.

FIG. 1C shows a 'selective-repeat' ARQ system, in which a transmitting side continuously transmits data regardless of a response from a receiving side. After receiving a NACK signal, the transmitting side retransmits the data corresponding to the received NACK signal only.

Hybrid ARQ (HARQ) is proposed to solve a problem occurring when a larger error occurs over a channel as a higher coding rate (Rc=5/6, 3/4), a high-order modulation (Mod=16-QAM, 64-QAM) and the like are selected due to a demand for a data rate over 2 Mbps, 10 Mbps or higher in a packet transmission communication system.

The erroneous data in transmission is stored in a buffer to have forward error correction (FEC) applied thereto by being combined with retransmitted information in the HARQ system. In contrast, the erroneous data in transmission is discarded in the ARQ system. The HARQ system is a type of system generated from combining FEC and ARQ together. Moreover, the HARQ can be mainly classified into the following four systems.

In the first system, a Type I HARQ system shown in FIG. 2, data is always attached to an error detection code to preferentially detect FEC (forward error correction). If there still remains an error in a packet, retransmission is requested. An erroneous packet is discarded and a retransmitted packet is used with a same FEC code.

In the second system, a Type II HARQ system called IR ARQ (incremental redundancy ARQ) shown in FIG. 3, an erroneous packet is not discarded but is stored in a buffer to be combined with retransmitted redundancy bits. In retransmission, parity bits except data bits are retransmitted only. The retransmitted parity bits are changed each retransmission.

In the third system, a Type III HARQ system shown in FIG. 4, which is a special case of the Type II HARQ system, each packet is self-decodable. The packet is configured with an erroneous part and data to be retransmitted. This system is more accurately decodable than the Type II HARQ system but is disadvantageous in the aspect of coding gain.

In the fourth system, a 'Type I with soft combining' HARQ system shown in FIG. 5, a function of data initially received and stored by a transmitting side with retransmitted data is added to the Type I HARQ system. The 'Type I with soft combining' HARQ system is called a metric combining or a chase combining system. This system is advantageous in the aspect of signal to interference plus noise ratio (SINR) and always uses the same parity bits of the retransmitted data.

Recently, many efforts have been made to research and develop OFDM (orthogonal frequency division multiplexing) or OFDMA (orthogonal frequency division multiplexing access) suitable for high-speed data transmission over a wired/wireless channel. In OFDM, frequency use efficiency is raised using a plurality of carrier waves having mutual orthogonality. A process of modulating/demodulating a plurality of the carrier waves in a transmission/reception has the same result as performing IDFT (inverse discrete Fourier transform)/DFT (discrete Fourier transform) and can be implemented at a high speed using IFFT(inverse fast Fourier transform)/FFT (fast Fourier transform).

A principle of the OFDM is to reduce relative dispersion in a time domain by multi-path delay spread in a manner of increasing a symbol duration by dividing a high-speed data stream into a plurality of low-speed data streams and by simultaneously transmitting a plurality of the low-speed data streams using a plurality of subcarriers. And, a transmission of data by the OFDM uses a transmission symbol as a unit.

Since the modulation/demodulation in the OFDM can be collectively handled for all subcarriers using DFT (discrete Fourier transform), it is unnecessary to design a modulator/demodulator for each of the individual subcarriers.

FIG. 6 illustrates a configuration of an orthogonal frequency division multiplexing (OFDM) modulator/demodulator. Referring to FIG. 6, a serially inputted data stream is transformed into parallel data streams amounting to the number of subcarriers. Inverse discrete Fourier transform (IDFT) is carried out on each of the parallel data streams. For fast data processing, IFFT (inverse fast Fourier transform) is used. The inverse-Fourier-transformed data is then converted to serial data again to be transmitted through frequency conversion. A receiving side receives the corresponding signal to demodulate through a reverse process.

In a mobile communication system, resources include frequency channels, i.e., frequency bands. Multiple access is a methodology of allocating the limited frequency bands to users for efficient use. Duplexing is a connection methodology of identifying an uplink (UL) connection and a downlink (DL) connection in bi-directional communication. Radio multiple access and multiplexing systems are the basic platform technology of the radio transmission to use the limited frequency resource efficiently and depend on an assigned frequency band, the number of users, a data rate, mobility, a cell structure, a radio environment, etc.

OFDM (orthogonal frequency division multiplexing), which is a sort of MCM (multicarrier transmission/modulation) system that uses several carriers, is a system that parallels input data as many as the number of used carriers to transmit the data loaded on the corresponding carriers. The OFDM is a strong candidate for a radio transmission technology meeting the requirements of a fourth generation mobile communication infrastructure and can be classified into OFDM frequency division multiple access (OFDM-FDMA), OFDM time division multiple access (OFDM-TDMA) and OFDM code division multiple access (OFDM-CDMA) according to a user's multiple access system. Each of the OFDM-FDMA, OFDM-TDMA and OFDM-CDMA systems has its merits and demerits. Moreover, schemes exist to compensate for the demerits.

The OFDM-FDMA (OFDMA), which is suitable for a fourth generation macro/micro cellular infrastructure, has no intra-cell interference, a high efficiency of frequency reuse and excellent adaptive modulation and granularity. Using dispersed frequency hopping, multiple antennas, powerful encoding and the like to compensate for the demerits of the OFDM-FDMA, diversity can be raised and the influence of inter-cell interference can be reduced. The OFDMA can efficiently distribute resources by allocating the number of subcarriers differently according to a data rate requested by each user. Furthermore, the OFDMA can raise the transmission efficiency since it is unnecessary for each user to perform initialization using a preamble prior to data reception like OFDM-TDMA. In particular, the OFDMA, which is suitable for a case using numerous subcarriers (e.g., a case wherein an FFT size is large), is efficiently applied to a radio communication system having a relatively wide cell area. Also, the frequency-hopping OFDMA system is used in raising a frequency diversity effect and obtaining an intermediate interference effect by overcoming a case where a subcarrier in deep fading exists in a radio channel or a case where there exists subcarrier interference caused by another user. FIG. 6 shows the OFDMA system, in which an allocated grid performs frequency-hopping in a frequency domain according to a time slot.

FIG. 7 is a structural diagram of a data frame in an OFDMA radio communication system according to the related art. Referring to FIG. 7, a horizontal axis is a time axis represented by a symbol unit and a vertical axis is a frequency axis represented by a subchannel unit. The subchannel refers to a bundle of a plurality of subcarriers. In particular, in an OFDMA physical layer, active carriers are divided into groups to be transmitted to different receiving ends, respectively. Thus, the group of subcarriers transmitted to one receiving end is called a subchannel. In this case, the carriers configuring the subchannel can be adjacent to each other or can be spaced uniformly apart from each other.

A slot allocated to each user, as shown in FIG. 7, is defined by a data region of a two-dimensional space, which is a set of consecutive subchannels allocated by a burst. In the OFDMA, one data region, as shown in FIG. 7, can be represented as a rectangle determined by time and subchannel coordinates. Such a data region can be allocated to a specific user's uplink. Also, a base station can transmit such a data region to a specific user in downlink.

In the related art OFDM/OFDMA radio communication system, in case that data exists to be transmitted to a mobile subscriber station (MSS), a base station (BS) allocates a data region to be transmitted via a DL-MAP (downlink-MAP). The mobile subscriber station receives the data via the allocated region (DL bursts #1 to #5 in FIG. 7).

In FIG. 7, a downlink subframe starts with a preamble used for synchronization and equalization in a physical layer and a structure of an entire frame is defined via broadcast-formatted downlink MAP (DL-MAP) and uplink-MAP (UL-MAP) messages defining locations and usages of bursts allocated to the uplink and downlink, respectively.

The DL-MAP message defines the usage allocated per burst to a downlink interval in a burst-mode physical layer, and the UL-MAP message defines the usage of the burst allocated to an uplink interval. In an information element (IE) configuring the DL-MAP message, a downlink traffic interval is identified on a user end by DIUC (downlink interval usage code) and position information (e.g., subchannel offset, symbol offset, subchannel number, symbol number) of the burst. Meanwhile, in an information element configuring the UL-MAP message, the usage is determined by UIUC (uplink interval usage code) per CID (connection ID) and a position of a corresponding interval is regulated by 'duration'. In this case, the usage per interval is determined according to a value of the UIUC used in the UL-MAP. Each interval starts from a point having a distance away from a previous IE start point, wherein the distance is as far as the 'duration' regulated by the UL-MAP IE.

A DCD (downlink channel descriptor) message and a UCD (uplink channel descriptor) message include modulation types, FEC code types and the like as physical layer associated parameters to be applied to the burst intervals allocated to the downlink and the uplink, respectively. Also, necessary parameters (e.g., K, R, etc. of R-S code) according to various forward error correction code types are provided. These parameters are given by burst profiles provided for the UIUC (uplink interval usage code) and DIUC (downlink interval usage code) in the UCD and DCD, respectively.

In the OFDMA communication system, the burst allocating method can be classified into a general MAP method and a HARQ method according to whether the HARQ system is supported.

The burst allocating method of the general MAP in downlink teaches a rectangular shape, as shown in FIG. 7, configured with time and frequency axes. Namely, it teaches a start symbol number (symbol offset), a start subchannel number (subchannel offset), the number of used symbols (No. OFDMA symbols) and the number of used subchannels (No. Subchannels). Since a method of allocating bursts to a symbol axis sequentially is used in the uplink, uplink bursts can be allocated by teaching the number of the used symbols only.

FIG. 8 is a diagram of a data frame according to a HARQ MAP. Referring to FIG. 8, in the HARQ MAP, a method of allocating bursts along a subchannel (subcarrier) axis sequentially is used in both uplink and downlink, which is different from that of a general MAP, In the HARQ MAP, a length of a burst is informed only. In this method, bursts, as shown in FIG. 8, are sequentially allocated. A start position of a burst corresponds to a position where a previous burst ends and occupies a radio resource amounting to an allocated length from the start position. The method explained in the following relates to a method for allocating bursts in an accumulative form along a frequency axis. A method for allocating bursts along a time axis follows the same principle.

In the HARQ MAP, a MAP message may be divided into a plurality of MAP messages (e.g., HARQ MAP#1, HARQ MAP#2, ..., HARQ MAP#N) so that each of the divided MAP messages can have information of a random burst. For instance, a MAP message #1 can include information of a burst #1, a MAP message #2 can include information of a burst #2, and a MAP message #3 can include information of bursts #3~#5.

As mentioned in the foregoing description, the OFDMA system uses the HARQ MAP to support the HARQ. Since a HARQ MAP pointer IE is included in the DL MAP, a method exists for allocating bursts sequentially along a downlink subchannel axis in the HARQ MAP if a position of the HARQ MAP is informed. A start position of a burst corresponds to a position where a previous burst ends and occupies a radio resource amounting to an allocated length from the start position, which is applied to the uplink as it is.

In the HARQ MAP, control information should be informed. Table 1 shows a data format of a HARQ control IE to indicate the control information.

TABLE 1

| Syntax | Size (bits) | Notes |
| --- | --- | --- |
| HARQ_Control_IE( ){ | | |
| Prefix | 1 | 0 = temporary disable HARQ |
| | | 1 = enable HARQ |
| If(Prefix == 1){ | | |
| AI_SN | 1 | HARQ ID Seq. No |
| SPID | 2 | Subpacket ID |
| ACID | 4 | HARQ CH ID |
| } else{ | | |
| reserved | 3 | Shall be set to zero |
| } | | |
| } | | |

The control information includes AI_SN, SPID, SCID, etc. The AI_SN is a value, which is toggled between '0' and '1' if a burst transmission is successful over a same ARQ channel, for indicating whether a transmitted burst is a new burst or corresponds to a retransmission of a previous burst. Four kinds of redundancy bits are reserved for the data bits put in each burst for the HARQ transmission. The SPID is a value for selecting a different redundancy bit during each retransmission. The SCID is a HARQ channel ID.

An ACK signal region of the uplink is informed via an ACK/NACK signal whether the transmitted data burst was successfully received. If a mobile subscriber station receives a burst at an $i^{th}$ frame, the ACK/NACK signal is sent to the ACK signal region of the uplink of an $(i+j)^{th}$ frame. A value of 'j' is sent by the UCD. In allocating the ACK signal region, one method exists for allocating the ACK signal region to the uplink for each HARQ message. Another method exists wherein at least two of a plurality of HARQ MAP messages of a frame uses one ACK signal region.

A method wherein slots of an ACK/NACK signal of a burst indicated by a HARQ MAP message is sequentially informed by deciding an HARQ ACK region of a frame as one is explained in detail as follows.

FIG. 9 is a diagram of a method for allocating an HARQ signal region in an HARQ MAP message. In an HARQ MAP message, an ACK signal region is allocated to an uplink using a start position of the ACK signal region and four kinds of information (OFDMA symbol offset, Subchannel offset, No. OFDMA Symbols, No. Subchannels). Each mobile subscriber station sequentially inputs an ACK/NACK signal to the ACK signal region (FIG. 9) allocated to the uplink for indicating whether a respective burst has been successfully received. A start position of the ACK/NACK signal corresponds to a position next to that of the previously received ACK/NACK information. A sequence of ACK/NACK signals follows a burst sequence of a downlink within the HARQ MAP message. Namely, like the sequence of bursts #1 to #7, the ACK/NACK signals within the allocated HARQ ACK region of the uplink are sent in a sequence that corresponds to the sequence of the bursts #1 to #7.

Referring to FIG. 9, a MAP message #1 includes allocation information of bursts #1 and #2, a MAP message #2 includes allocation information of bursts #3 and #4, and a MAP message #3 includes allocation information of bursts #5 to #7. Mobile subscriber station #1 (MSS#1) reads the information of the burst #1 in the contents of the MAP message #1 and then informs an initial slot within the HARQ ACK signal region indicated by an HARQ MAP message whether the transmitted data was successfully received. MSS#2 knows its position within the HARQ ACK signal region by recognizing that it is sequentially next to that of the ACK/NACK signal slot of the burst #1 within the ACK signal region (position within the HARQ ACK region is known by incrementing a count of the burst #1 within the contents of the MAP message #1). MSS#3 knows its position within the HARQ ACK region by calculating a total amount of slots of the bursts #1 and #2 of the MAP message #1. Thus, the positions within the HARQ ACK region can be sequentially known.

In case that one mobile subscriber station supporting a multi-antenna to an area of the downlink burst loads data on the same area to transmit or in case that several mobile subscriber stations load data on the same area to transmit, the ACK signal is sent only if there is no error in a cyclic redundancy check (CRC) for all layers. Otherwise, the NACK signal is sent. In this case, a layer means a coding unit of the transmitted data and the number of layers directly corresponds to the number of antennas depending on how the data is transmitted. For example, if the entire data to be transmitted is coded. A CRC is then inserted in the coded data. This is then divided by the number of antennas. If the divided data are transmitted via all the antennas, the number of layers is equal to one. In another example, if data to be loaded on each antenna is coded. A CRC is then inserted in the coded data. If the coded data is transmitted, the number of layers is equal to the number of antennas (cf. FIG. 10). The above-explained situation is applicable to a case where a mobile subscriber station transmits a burst in uplink and a case where a base station having received the burst sends an ACK signal in downlink.

The above-explained related art method can be simply applied to a system that is not a multi-antenna system. Yet, in case of the multi-antenna system, the related art method brings about a waste of resources. For example, if a base station detects a case that two mobile subscriber stations #1 and #2 load their data on the burst #2, the number of layers is 2. Furthermore, the burst of the mobile subscriber station #1 is not erroneous but the burst of the mobile subscriber station #2 is erroneous. The base station then sends a NACK signal to both the mobile subscriber stations #1 and #2 according to the aforesaid principle of the related art. If so, both of the mobile subscriber stations should send the data again. Consequently, the errorless data of the mobile subscriber station #1 is discarded to be retransmitted, which is a waste of resources. Moreover, the same problem of the uplink can be directly applied to the case of the downlink.

SUMMARY OF THE INVENTION

The present invention is directed to transmitting packet data in a wireless communication system configured to support multiple input and multiple output Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method of transmitting packet data in a wireless communication system configured to support multiple input and multiple output, the method comprising receiving a downlink data frame comprising a data map information element and a data burst comprising a plurality of layers, wherein each layer is encoded with a corresponding channel encoder, and wherein the data map information element is configured to support multiple antennas to achieve space time transmit diversity by providing control information associated with each one of the plurality of layers, wherein the control information comprises allocation of acknowledgement status channels corresponding to the plurality of layers, and transmitting in an uplink data frame a plurality of acknowledgement status, each acknowledgement status being associated with whether a corresponding layer of the plurality of layers is properly decoded.

In one aspect of the invention, the control information for each one of the plurality of layers comprises at least one of a traffic interval, a channel identifier, a retransmission status and a value to select a different redundancy bit during retransmission.

In a further aspect of the invention, the channel encoder comprises a forward error correction encoder.

In another aspect of the invention, the data map information element comprises a HARQ map information element.

In one aspect of the invention, a half subchannel is used for each acknowledgement status.

In a further aspect of the invention, at least part of the plurality of acknowledgement status is represented by code words.

In another aspect of the invention, the data map information element is one of an uplink map information element and a downlink map information element.

In accordance with another embodiment of the present invention, a method of transmitting packet data in a wireless communication system configured to support multiple input and multiple output comprises receiving a first downlink data frame comprising a data map information element, wherein the data map information element is configured to support multiple antennas to achieve space time transmit diversity by providing control information associated with each one of a plurality of layers, wherein the control information comprises allocation of acknowledgement status channels corresponding to the plurality of layers, transmitting in an uplink data frame a data burst comprising the plurality of layers, wherein each layer is encoded with a corresponding channel encoder, and receiving a second downlink data frame comprising a plurality of acknowledgement status, each acknowledgement status being associated with whether a corresponding layer of the plurality of layers is properly decoded.

In one aspect of the invention, the control information for each one of the plurality of layers comprises at least one of a traffic interval, a channel identifier, a retransmission status and a value to select a different redundancy bit during retransmission.

In a further aspect of the invention, the channel encoder comprises a forward error correction encoder.

In another aspect of the invention, the data map information element comprises a HARQ map information element.

In one aspect of the invention, a half subchannel is used for each acknowledgement status.

In a further aspect of the invention, at least part of the plurality of acknowledgement status is represented by code words.

In another aspect of the invention, the data map information element is one of an uplink map information element and a downlink map information element.

In accordance with another embodiment of the present invention, a method of transmitting packet data in a wireless communication system configured to support multiple input and multiple output comprises transmitting to a receiving device a downlink data frame comprising a data map information element and a data burst comprising a plurality of layers, wherein each layer is encoded with a corresponding channel encoder, and wherein the data map information element is configured to support multiple antennas to achieve space time transmit diversity by providing control information associated with each one of the plurality of layers, wherein the control information comprises allocation of acknowledgement status channels corresponding to the plurality of layers, and receiving an uplink data frame comprising a plurality of acknowledgement status, each acknowledgement status being associated with whether a corresponding layer of the plurality of layers is properly decoded by the receiving device.

In one aspect of the invention, the control information for each one of the plurality of layers comprises at least one of a traffic interval, a channel identifier, a retransmission status and a value to select a different redundancy bit during retransmission.

In a further aspect of the invention, the channel encoder comprises a forward error correction encoder.

In another aspect of the invention, the data map information element comprises a HARQ map information element.

Preferably, the method further comprises retransmitting data associated with a corresponding layer upon receiving an acknowledgement indicating that the corresponding layer was not properly decoded by the receiving device.

In one aspect of the invention, a half subchannel is used for each acknowledgement status.

In a further aspect of the invention, at least part of the plurality of acknowledgement status is represented by code words.

In another aspect of the invention, the data map information element is one of an uplink map information element and a downlink map information element.

In accordance with another embodiment of the present invention, a wireless communication apparatus for transmitting packet data comprises a plurality of antennas to achieve space time transmit diversity, a plurality of channel encoders, each associated with a corresponding antenna, and a controller configured to recognize a transmitting data frame comprising a data map information element and a data burst comprising a plurality of layers, wherein each layer is encoded with a corresponding channel encoder, and wherein the data map information element comprises control information for each one of the plurality of layers, wherein the controller is further configured to recognize a receiving data frame comprising a plurality of acknowledgement status, each acknowledgement status being associated with whether a corresponding layer of the plurality of layers is properly received by a receiving device.

In one aspect of the invention, the control information for each one of the plurality of layers comprises at least one of a traffic interval, a channel identifier, a retransmission status and a value to select a different redundancy bit during retransmission.

In a further aspect of the invention, the channel encoder comprises a forward error correction encoder.

In another aspect of the invention, the data map information element comprises a HARQ map information element.

In one aspect of the invention, a half subchannel is used for each acknowledgement status.

In a further aspect of the invention, at least part of the plurality of acknowledgement status is represented by code words.

In another aspect of the invention, the data map information element is one of an uplink map information element and a downlink map information element.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to supporting hybrid automatic retransmission request (HARQ) in an orthogonal frequency division multiplexing access (OFDMA) radio access system. Specifically, the present invention relates to transmitting packet data in a wireless communication system configured to support multiple input and multiple output.

Reference will now be made in detail to the preferred embodiments of the present invention, examples of which are illustrated in the accompanying drawings. Wherever possible, the same reference numbers will be used throughout the drawings to refer to the same or like parts.

The present invention discloses a method for sending an ACK or NACK signal per layer when a multi-antenna system is applied to an uplink or downlink data burst. In other words, ACK/NACK signal transport channels amounting to the number of layers allocated to the data burst are allocated to the uplink or downlink data burst having the multi-antenna system applied thereto.

When a mobile subscriber station supporting a multi-antenna in a downlink burst sends data loaded in the same frame or in case that several mobile stations send data loaded in the same frame, signals of all layers are loaded in the same frame. Yet, a receiving side detects the signals and identifies the signal per the layer. And, it is able to know a presence or non-presence of error of the per layer signal by performing a cyclic redundancy check (CRC) for the signal of the identified layer.

The present invention intends to enable a transmitting side to know the presence or non-presence of error of the signal per layer by transmitting an ACK or NACK signal. To support this, allocation of an ACK or NACK channel per layer is needed so that the presence or non-presence of error can be carried. Via the channels, a side having transmitted a burst can receive the ACK or NACK signal per layer and then decide a next transmission form. For example, by re-transmitting the signal of the layer corresponding to the received NACK or by stopping transmission of the signal of the layer corresponding to the received ACK until other layers receive the ACK signals according to an implementation method of the system, interference with other signals is reduced.

By loading other data, the system is able to increase a transmission capacity. Thus, to use a different transmission method per layer, control information should be given to each layer. For example, in the related art, the combined control information is given since all layers receive the ACK or NACK together. Yet, according to the present invention, various kinds of control information is preferably given such as information indicating whether each layer receives the ACK or NACK, whether to give a new burst, whether to retransmit a previous burst (AI_SN), which redundancy bit of four types (SPID) will be given and information regarding an H-ARQ channel ID (SCID).

Figure 11:
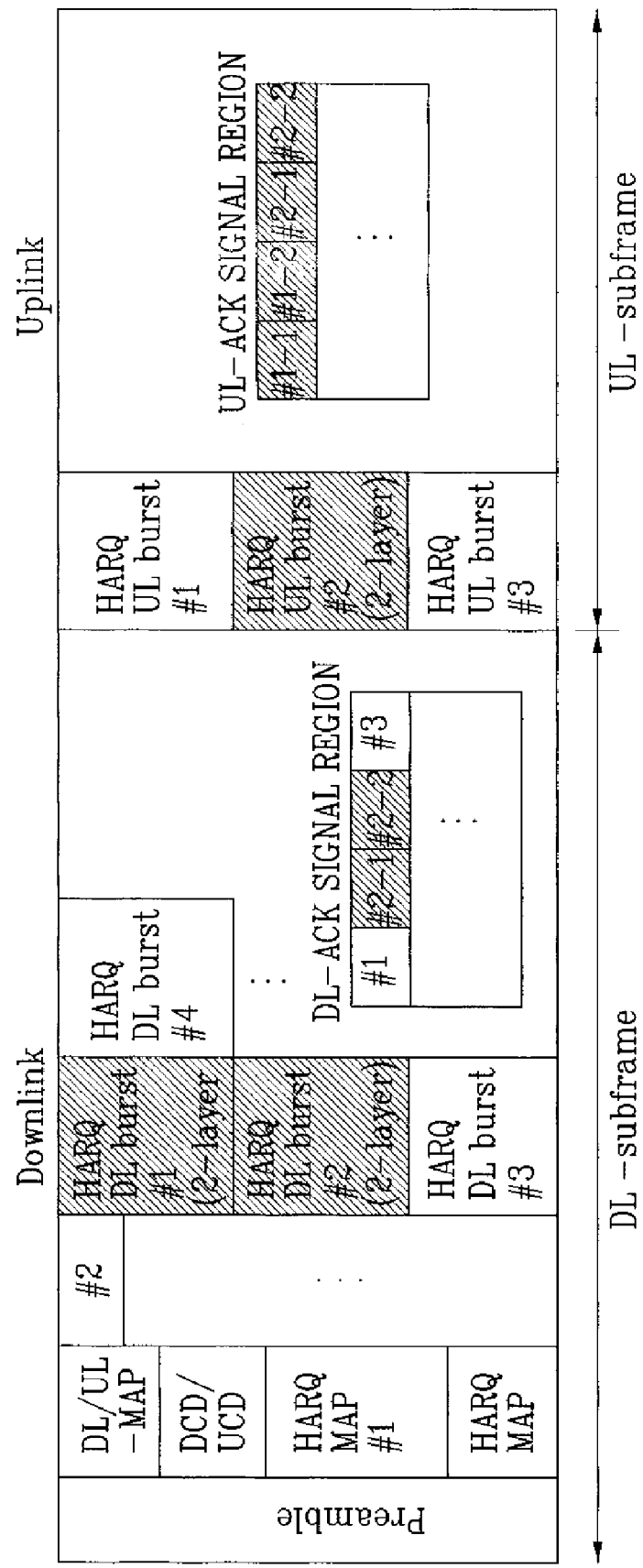
FIG. 11 illustrates a data frame in an OFDMA radio access system in accordance with one preferred embodiment of the present invention.

FIG. 11 is a diagram of a data frame in an OFDMA radio access system in accordance with a preferred embodiment of the present invention. Preferably, an ACK/NACK transport channel allocating method conducted by a base station transmitting data by two layers to a plurality of mobile subscriber stations applying a multi-antenna system is shown.

Referring to FIG. 11, a base station allocates a downlink ACK region (DL-ACK SIGNAL REGION) to a downlink (DL) subframe and an uplink ACK signal region (UL-ACK SIGNAL REGION) to an uplink (UL) subframe. The downlink ACK signal region is a region allocated for an ACK or NACK signal transmitted by the base station in response to data transmitted from a plurality of mobile subscriber stations. The uplink ACK signal region is a region allocated for ACK or NACK signals transmitted by one or more of mobile subscriber stations in response to data transmitted from the base station.

In case that the base station transmits data bursts comprising two layers, the mobile subscriber stations receiving the data bursts by the two layers check for a transmission error of the data transmitted per each layer of the base station (e.g., CRC check). If there is no transmission error per layer according to a checked result, a corresponding mobile subscriber station transmits an ACK signal. If there exists the transmission error, a corresponding mobile subscriber station transmits a NACK signal. One ACK/NACK transport channel is allocated for the mobile subscriber stations receiving the data burst transmitted with one layer by the base station. Consequently, ACK/NACK transport channels #1-1, #1-2, #2-1, #2-2, #3, #4 ... amounting to the same number of layers used for the base station to transmit the respective data bursts are allocated to the uplink ACK signal region of the uplink subframe for the mobile subscriber stations, respectively.

Within the downlink ACK signal region, the base station allocates the ACK/NACK transport channels #2-1 and #2-2 per layer for the mobile subscriber station transmitting data by two layers and one ACK/NACK transport channel #1, #3, #4 or the like for each of the mobile subscriber stations that use one layer each. The base station checks for a transmission error for the data transmitted from the corresponding mobile subscriber station (e.g., CRC check). If there is no transmission error per layer according to a checked result, the base station transmits an ACK signal. If a transmission error exists, the base station transmits a NACK signal.

Figure 12:
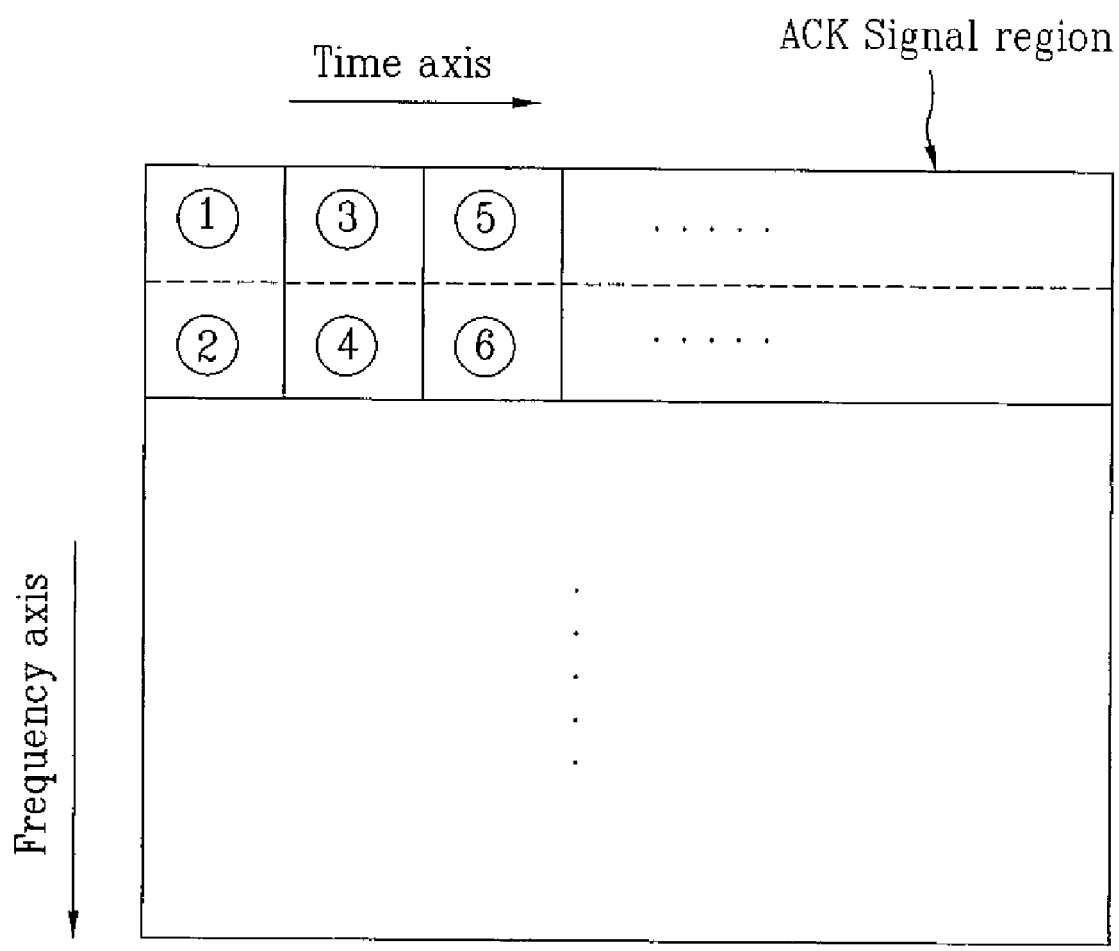
FIG. 12 is illustrates an allocation sequence of an ACK/NACK transport channel in accordance with one preferred embodiment of the present invention.

The ACK/NACK transport channel can be sequentially allocated along a time axis within the uplink ACK signal region and the downlink ACK signal region, along a frequency axis, or along frequency and time axes alternately. Alternatively, a half subchannel may be used per one ACK or NACK signal to be allocated along frequency and time axes alternately in order, as shown in FIG. 12. Preferably, the half subchannel includes twenty-four subcarriers.

Figure 13:
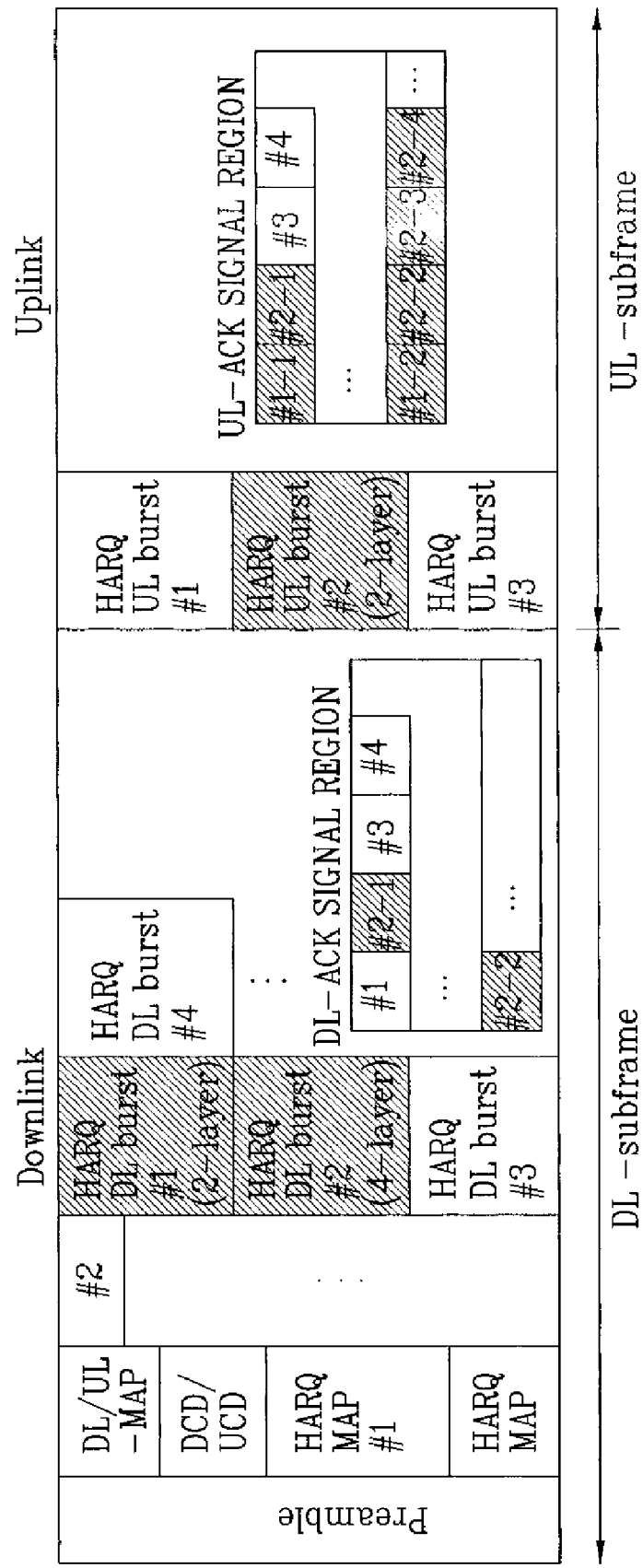
FIG. 13 illustrates a method for allocating ACK/NACK transport channels within uplink and downlink ACK signal regions in accordance with one preferred embodiment of the present invention.

FIG. 13 is an exemplary diagram of a method for allocating the ACK/NACK transport channels within uplink and downlink ACK signal regions in accordance with another embodiment of the present invention. Preferably, an uplink or downlink ACK region for a mobile subscriber station having a multi-antenna system is separately allocated within an uplink ACK signal region and a downlink ACK signal region.

Referring to FIG. 13, for a mobile subscriber station transmitting a data burst by two layers (2-layer) within a downlink ACK region, one ACK/NACK transport channel #2-1 for a first layer is allocated together with an ACK/NACK transport channel for a mobile subscriber station transmitting a data burst by one layer. The other ACK/NACK transport channel #2-2 for a second layer is allocated by establishing a separate ACK region within the downlink ACK region. Preferably, the same method is applied to an uplink ACK region (UL-ACK region).

In FIG. 13, a base station transmits an HARQ DL burst #2 by four layers (4-layer). The separate ACK region allocated for the second or higher-order layer is preferably allocated next to the region to which the ACK/NACK transport channel for the first layer is allocated.

Figure 14:
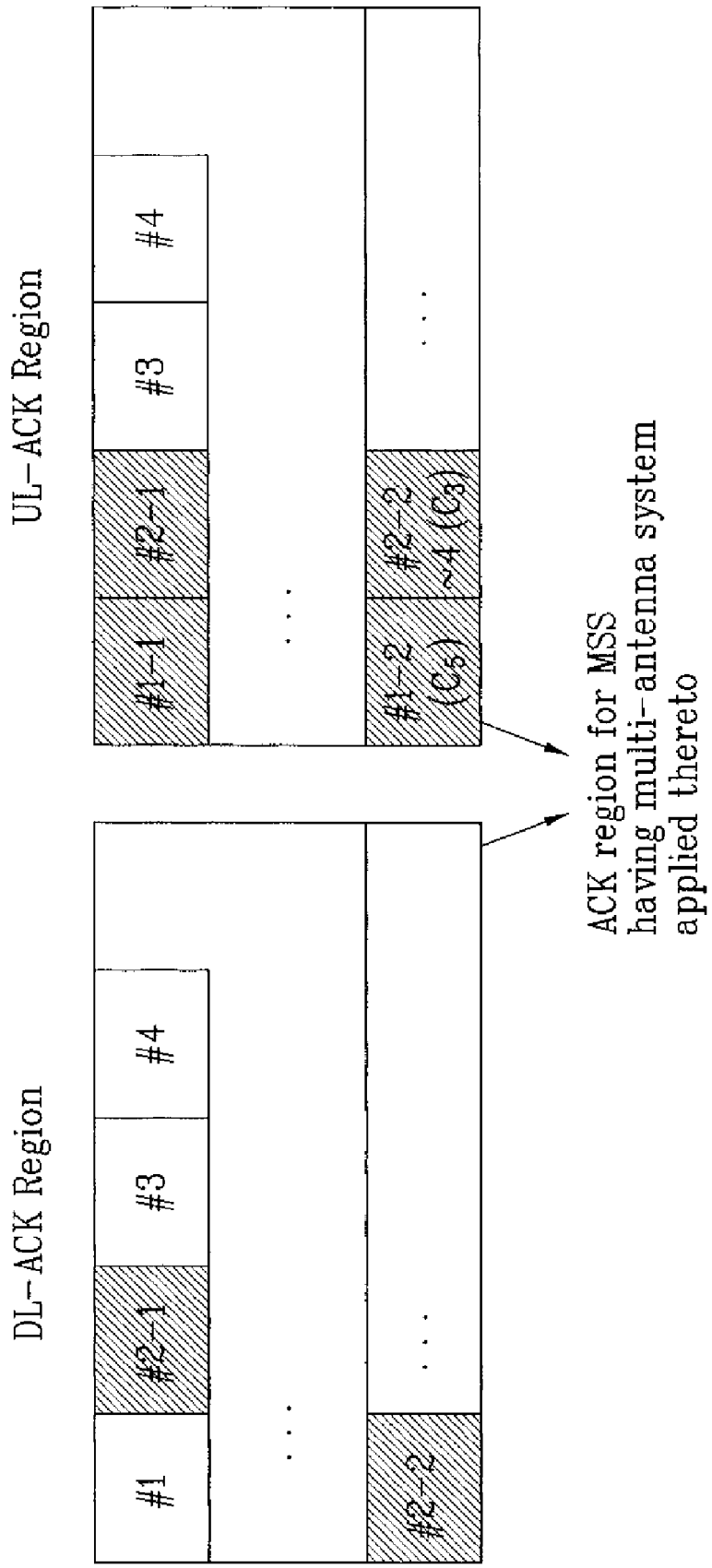
FIG. 14 illustrates a method for allocating ACK/NACK transport channels within uplink and downlink ACK signal regions in accordance with one preferred embodiment of the present invention.

FIG. 14 is an exemplary diagram of a method for allocating the ACK/NACK transport channels within uplink and downlink ACK signal regions in accordance with another embodiment of the present invention.

In FIG. 14, an uplink or downlink ACK region for a mobile subscriber station having a multi-antenna system is separately allocated within an uplink ACK signal region and a downlink ACK signal region. The method shown in FIG. 14 differs from the method embodied in FIG. 13 in that a plurality of ACK/NACK transport channels #2-2, #2-3 and #2-4 for the same data burst having a plurality of layers applied thereto are allocated as one ACK/NACK transport channel using a codeword. Namely, in the example shown in FIG. 14, the codeword is used to reduce a range of the uplink ACK region because the range of the uplink ACK region can be unnecessarily extended if the number of layers is raised.

Table 2 and Table 3 show examples of codewords to support FIG. 14.

TABLE 2

| Codeword [layer4, layer3, layer2] | Group sets (total 24 subcarriers) |
|---|---|
| C0 [0 0 0] | G0 G0 G0 |
| C1 [0 0 1] | G4 G7 G2 |
| C2 [0 1 0] | G7 G2 G4 |
| C3 [0 1 1] | G2 G4 G7 |
| C4 [1 0 0] | G1 G3 G5 |
| C5 [1 0 1] | G3 G5 G1 |
| C6 [1 1 0] | G5 G1 G3 |
| C7 [1 1 1] | G6 G6 G6 |

TABLE 3

| Group set | Signal of 8-subcarriers to be transmitted |
|---|---|
| G0 | P0, P1, P2, P3, P0, P1, P2, P3 |
| G1 | P0, P3, P2, P1, P0, P3, P2, P1 |
| G2 | P0, P0, P1, P1, P2, P2, P3, P3 |
| G3 | P0, P0, P3, P3, P2, P2, P1, P1 |
| G4 | P0, P0, P0, P0, P0, P0, P0, P0 |
| G5 | P0, P2, P0, P2, P0, P2, P0, P2 |
| G6 | P0, P2, P0, P2, P2, P0, P2, P0 |
| G7 | P0, P2, P2, P0, P2, P0, P0, P2 |

In transmission of an uplink ACK/NACK signal, as mentioned in the foregoing description, a half subchannel includes twenty-four subcarriers per one ACK or NACK signal. If the codeword in Table 2 or Table 3 is used, it is able to transmit one to three ACK or NACK signals using the twenty-four subcarriers. The examples in Table 2 and Table 3 define the codeword for four layers, which are applicable to two or three layers as well. Preferably, for the data burst having three layers applied thereto, the codeword associated with the layer-4 in Table 1 and Table 3 is ignored. For the data burst having two layers applied thereto, the codewords associated with the layer-4 and the layer-3 in Table 1 and Table 3 are ignored.

Meanwhile, in case of downlink, like the related art method, the necessity for using the codeword is lowered if an ACK/NACK signal is transmitted using one bit.

Figure 15:
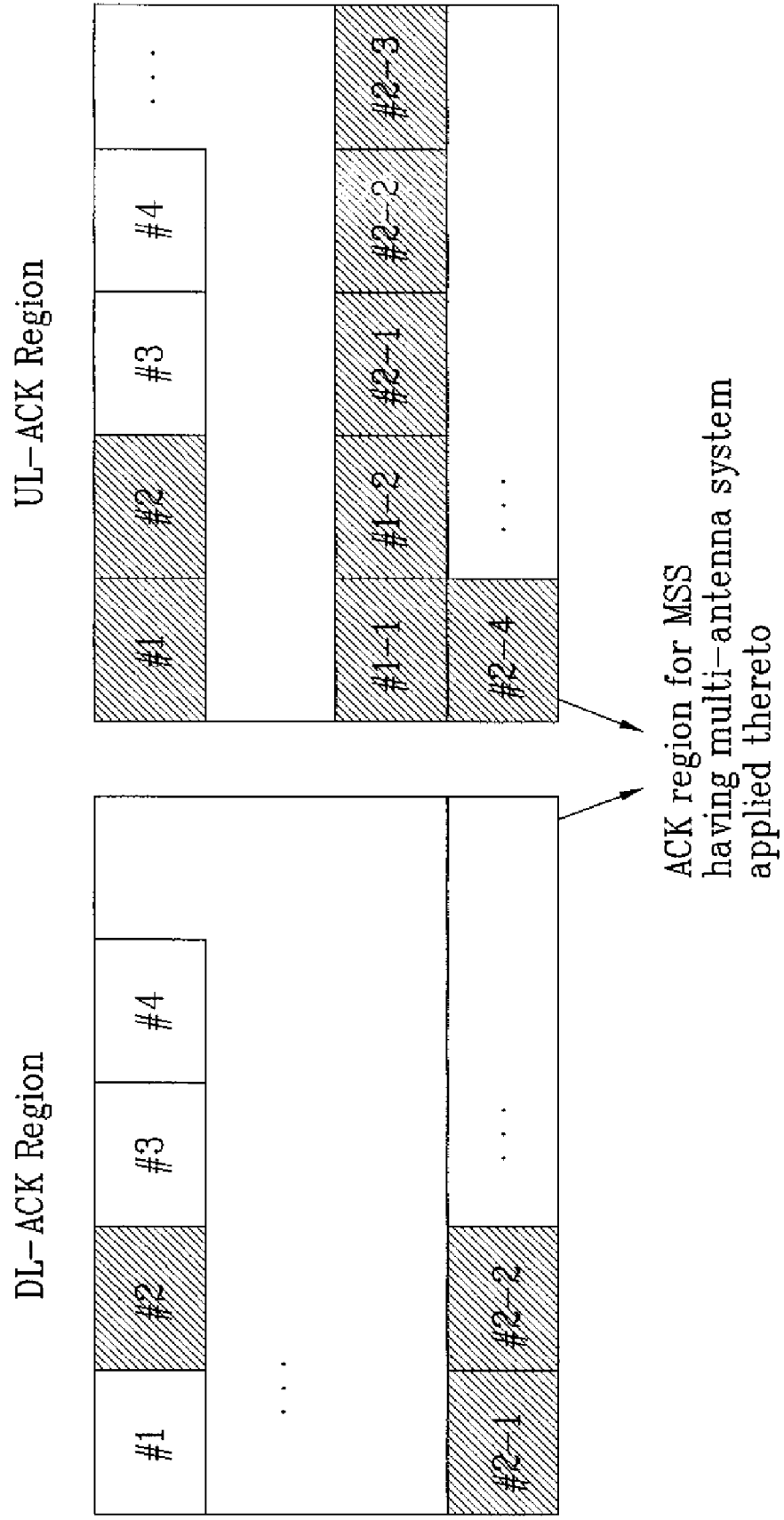
FIG. 15 illustrates a method for allocating ACK/NACK transport channels within uplink and downlink ACK signal regions in accordance with one preferred embodiment of the present invention.

FIG. 15 is an exemplary diagram of a method for allocating the ACK/NACK transport channels within uplink and downlink ACK signal regions in accordance with another embodiment of the present invention.

Referring to FIG. 15, an ACK region for a mobile subscriber station using a data burst and having a multi-antenna system applied thereto is separately allocated in the same manner as FIG. 13 or FIG. 14. ACK/NACK transport channels are allocated to the rest uplink or downlink ACK region. Hence, an ACK signal is sent only if a CRC is not erroneous for all layers. Otherwise, a NACK signal is sent.

Table 4 and Table 5 show formats of MIMO compact DL-MAP IE and MIMO compact UL-MAP IE according to one embodiment of the present invention, respectively.

TABLE 4

| Syntax | Size (bits) | Notes |
| --- | --- | --- |
| MIMO Compact DL-MAP IE( ) | | |
| Compact_DL-MAP Type | 3 | Type = 7 |
| DL-MAP Subtype | 5 | MIMO = 0x01 |
| Length | 4 | Length of the IE in Bytes |
| Matrix indicator | 2 | DL_STC matrices (see 8.4.8.3) |
| Num layer | 2 | Number of multiple coding/modulation layers<br>00 - 1 layer<br>01 - 2 layer<br>10 - 3 layer<br>11 - 4 layer |
| For(j=1;j<Num_layer;j++){ | | This loop specifies the Nep for layers 2 and above when required for STC.<br>The same Nsch and RCID applied for each layer |
|   If (H-ARQ Mode = CTC Incremental Redundancy) {<br>    Nep}<br>  Else if (H-ARQ Mode = Generic Chase){<br>    DIUC<br>  } | 4 | H-ARQ Mode is specified in the H-ARQ Compact_DL-MAP IE format for Switch HARQ Mode. |
| CQI Feedback_Type | 3 | Type of contents on CQICH for this SS<br>000 = Default feedback<br>001 = Percoding weight matrix W<br>010 = Channel matrix H<br>011 = MIMO mode and permutation zone<br>100~111 = Reserved |
| CQICH_Num | 2 | Total number of CQICHs assigned to this MSS is (CQICH_Num + 1) |
| For(I=1;i<CQICH_Num;i++){ | | |
| Allocation index | 6 | Index to uniquely identify the additional CQICH resources assigned to the SS |
| } | | |
| H-ARQ_Control_IE | variable | |
| Padding | variable | The padding bits are used to ensure the IE size is integer number of bytes. |
| } | | |

TABLE 5

| Syntax | Size (bits) | Notes |
| --- | --- | --- |
| MIMO Compact UL-MAP IE( ) | | |
| Compact_UL-MAP Type | 3 | Type = 7 |
| UL-MAP Subtype | 5 | MIMO = 0x01 |
| Length | 4 | Length of the IE in Bytes |
| Matrix indicator | 2 | UL_STC matrices (see 8.4.8.4)<br>For 2-antenna SS,<br>0 = Matrix A<br>1 = Matrix B<br>For Collaborative SM capable SS,<br>0 = Pilot pattern A<br>1 = Pilot pattern B |
| Num_layer | 1 | Number of multiple coding/modulation layers<br>00 - 1 layer<br>01 - 2 layer |
| For(j=1;j<Num_layer;j++){ | | This loop specifies the Nep for layers 2 and above whenrequired for STC.<br>The same Nsch and RCID applied for each layer |
|   If (H-ARQ Mode = CTC Incremental Redundancy) {<br>    Nep}<br>  Else if (H-ARQ Mode = Generic Chase){<br>    DIUC<br>  } | 4 | H-ARQ Mode is specified in the H-ARQ Compact_DL-MAP IE format for Switch HARQ Mode. |
| H-ARQ_Control_IE | variable | |
| Padding | variable | The padding bits are used to ensure the IE size is integer number of bytes. |
| } | | |

Since it is unable to provide control information per layer, the related art information element (IE) is not capable of supporting the present invention. Hence, the information message (MIMO Compact DL/UL MAP IE) to support the HARQ multi-antenna should be provided with various kinds of control information to enable each layer to have a different operation. In this case, the various kinds of control information include information indicating whether a new burst will be given or a previous burst will be retransmitted according to ACK or NACK provided to each layer (AI_SN), information indicating which redundancy bit of the four types will be given (SPID), and information of H-ARQ channel ID (SCID). The various kinds of control information can have fields directly arranged in the information message (MIMO Compact DL/UL MAP IE) supporting the HARQ multi-antenna if necessary. Alternatively, the various kinds of control information can be used in a manner of inserting the related art information element 'Control_IE' in the information message (MIMO Compact DL/UL MAP IE) supporting the HARQ multi-antenna.

Accordingly, in the present invention, in case that the multi-antenna system transmits signals by a plurality of antennas via the same uplink or downlink data burst, the ACK or NACK signal is transmitted per layer. Hence, the present invention can reduce the overhead generated from the retransmission regardless of the transmission error.

Although the present invention is described in the context of mobile communication, the present invention may also be used in any wireless communication systems using mobile devices, such as PDAs and laptop computers equipped with wireless communication capabilities.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Figure 1A:
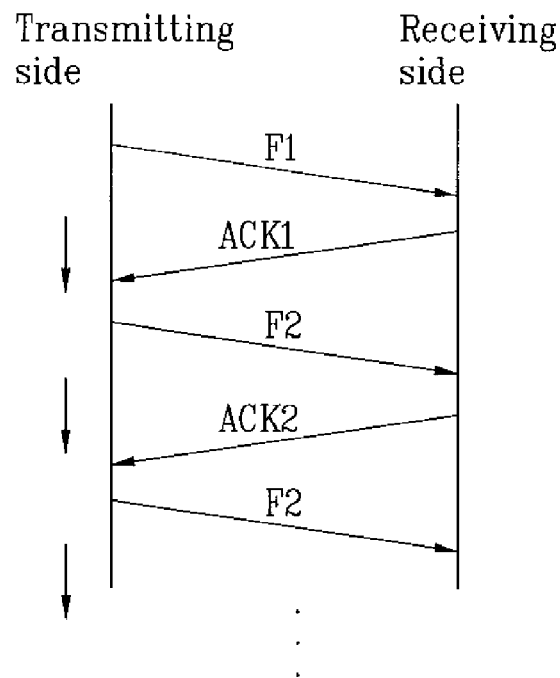
FIGS. 1A to 1C illustrate different types of automatic repeat request (ARQ) systems in accordance with the related art.
Figure 1B:
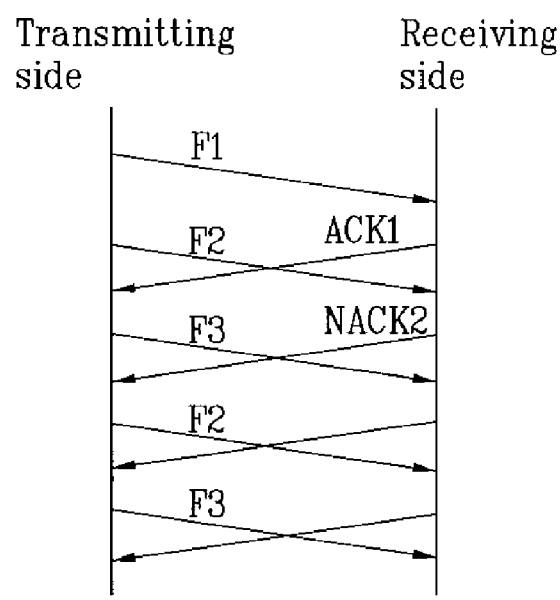
Figure 1C:
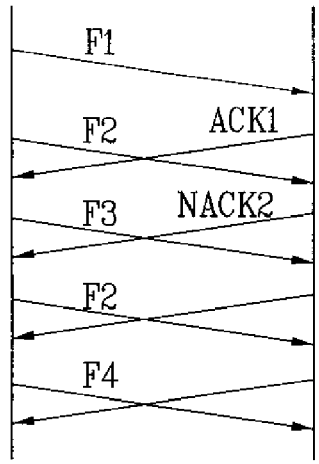
Figure 2:
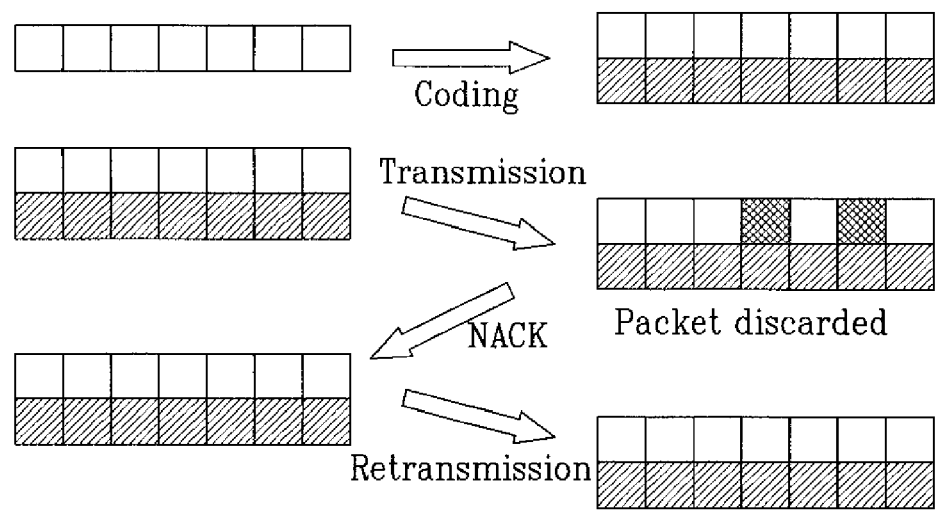
FIGS. 2 to 5 illustrate the features of the different types of ARQ systems in accordance with the related art.
Figure 3:
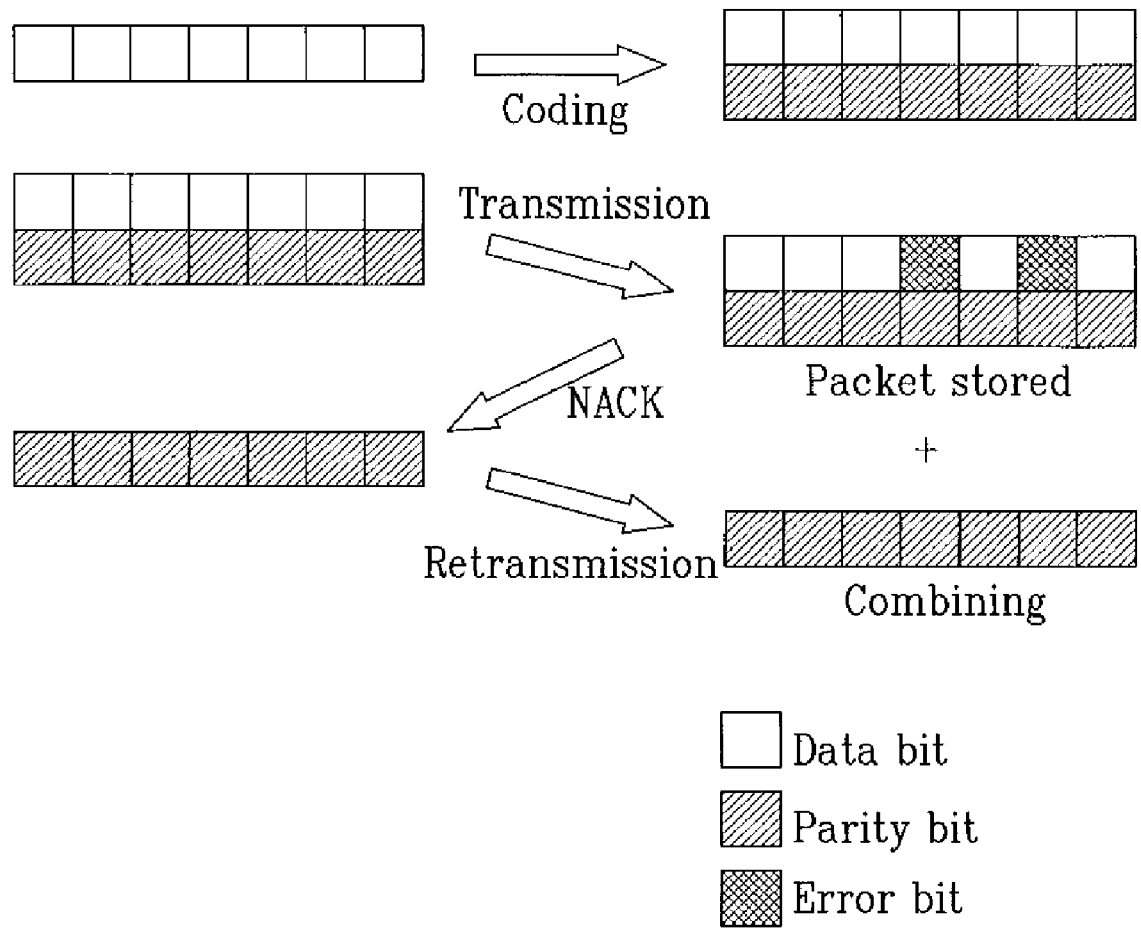
Figure 4:
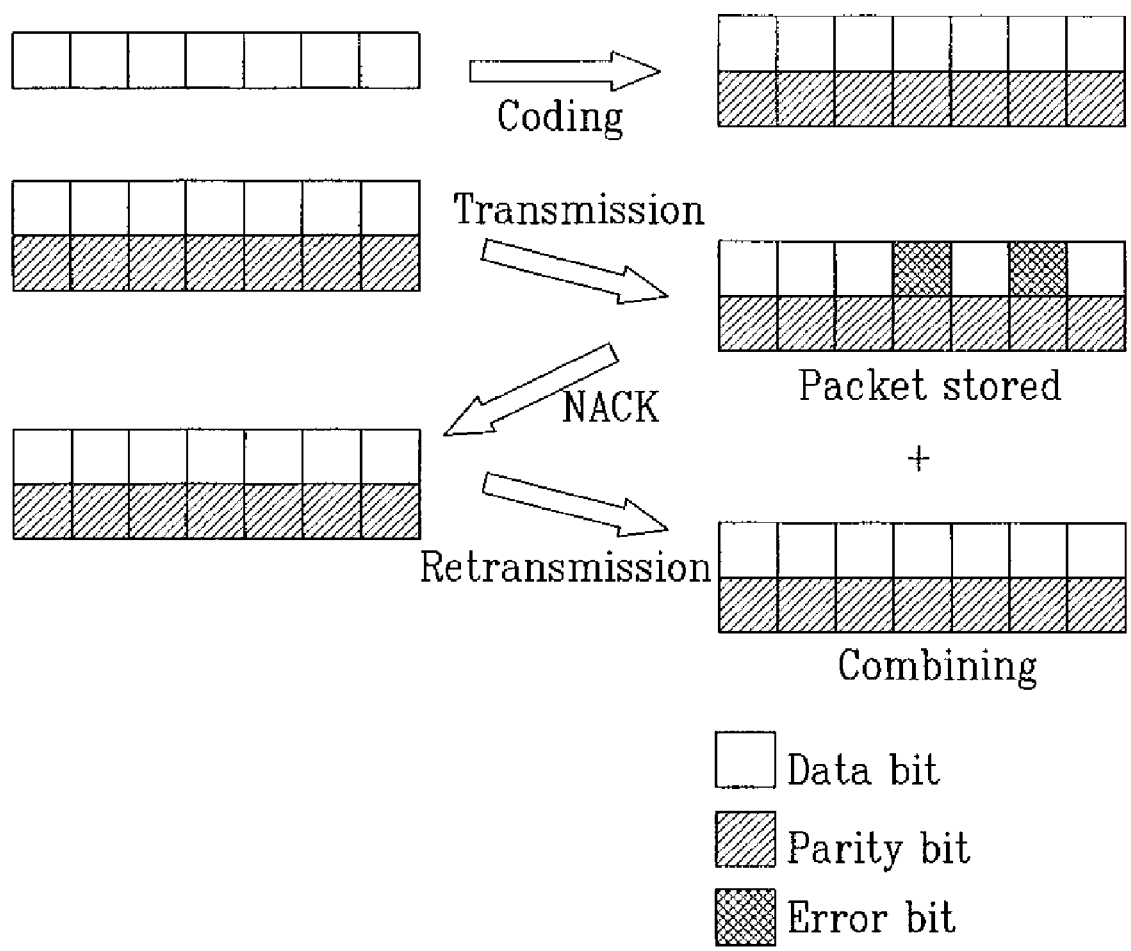
Figure 5:
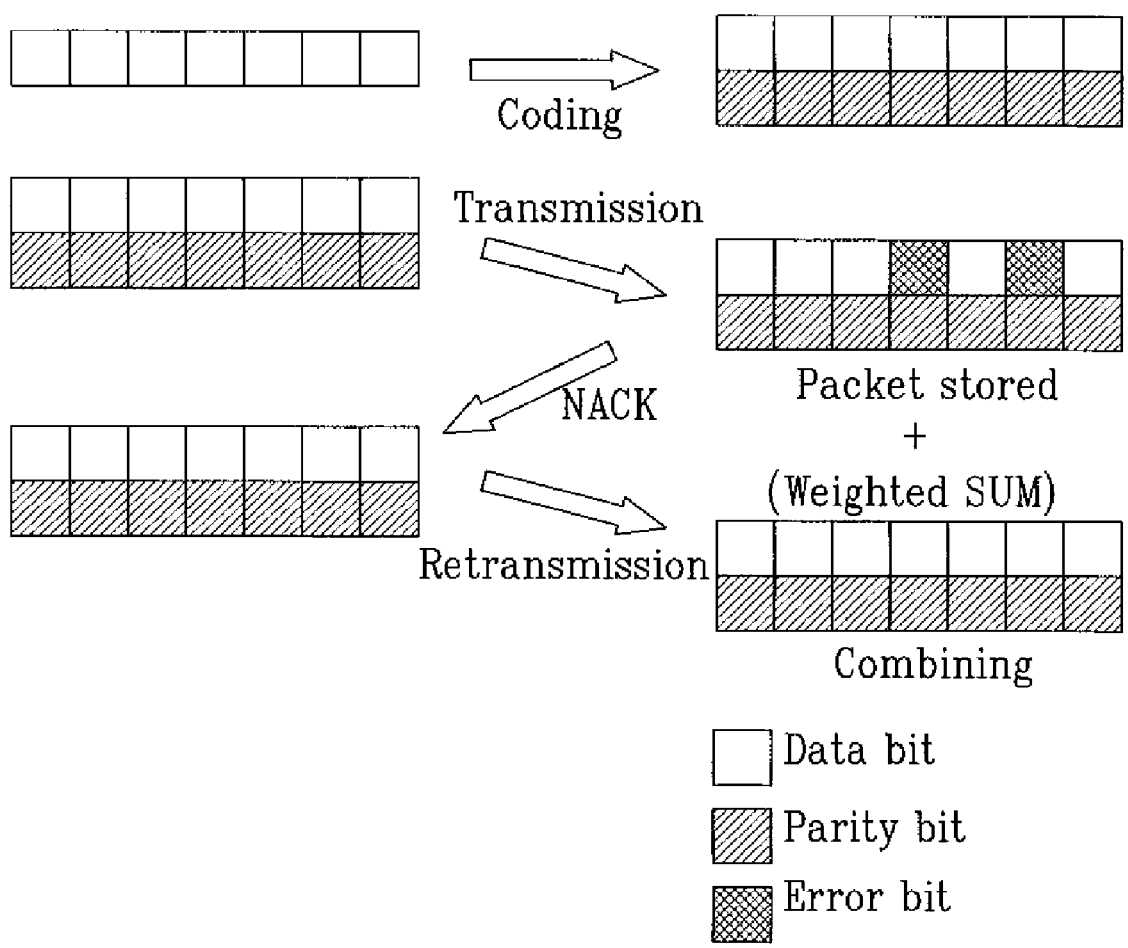
Figure 6:
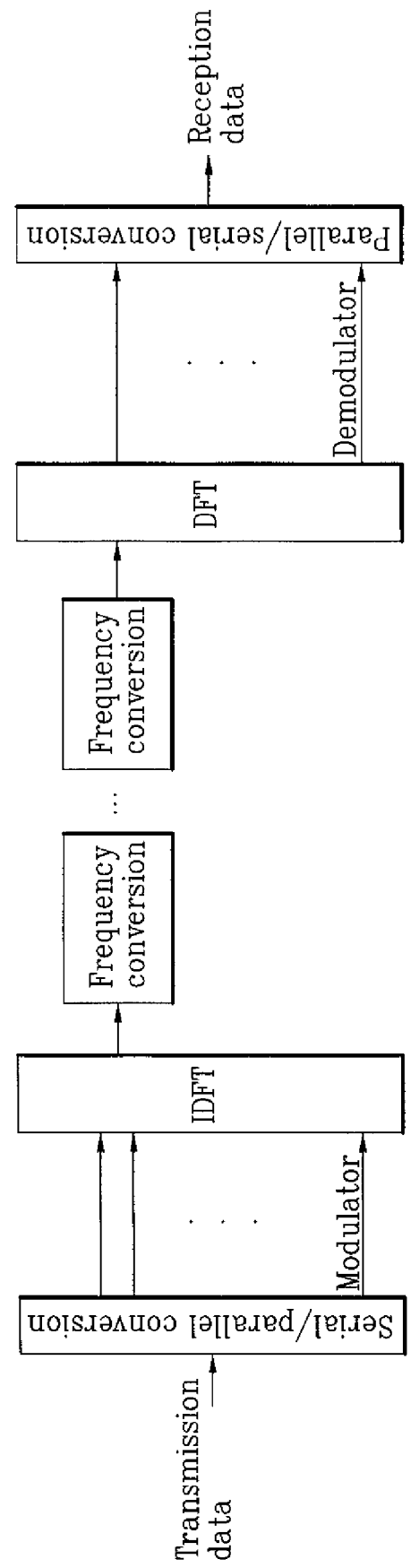
FIG. 6 illustrates a configuration of an orthogonal frequency division multiplexing (OFDM) modulator/demodulator.
Figure 7:
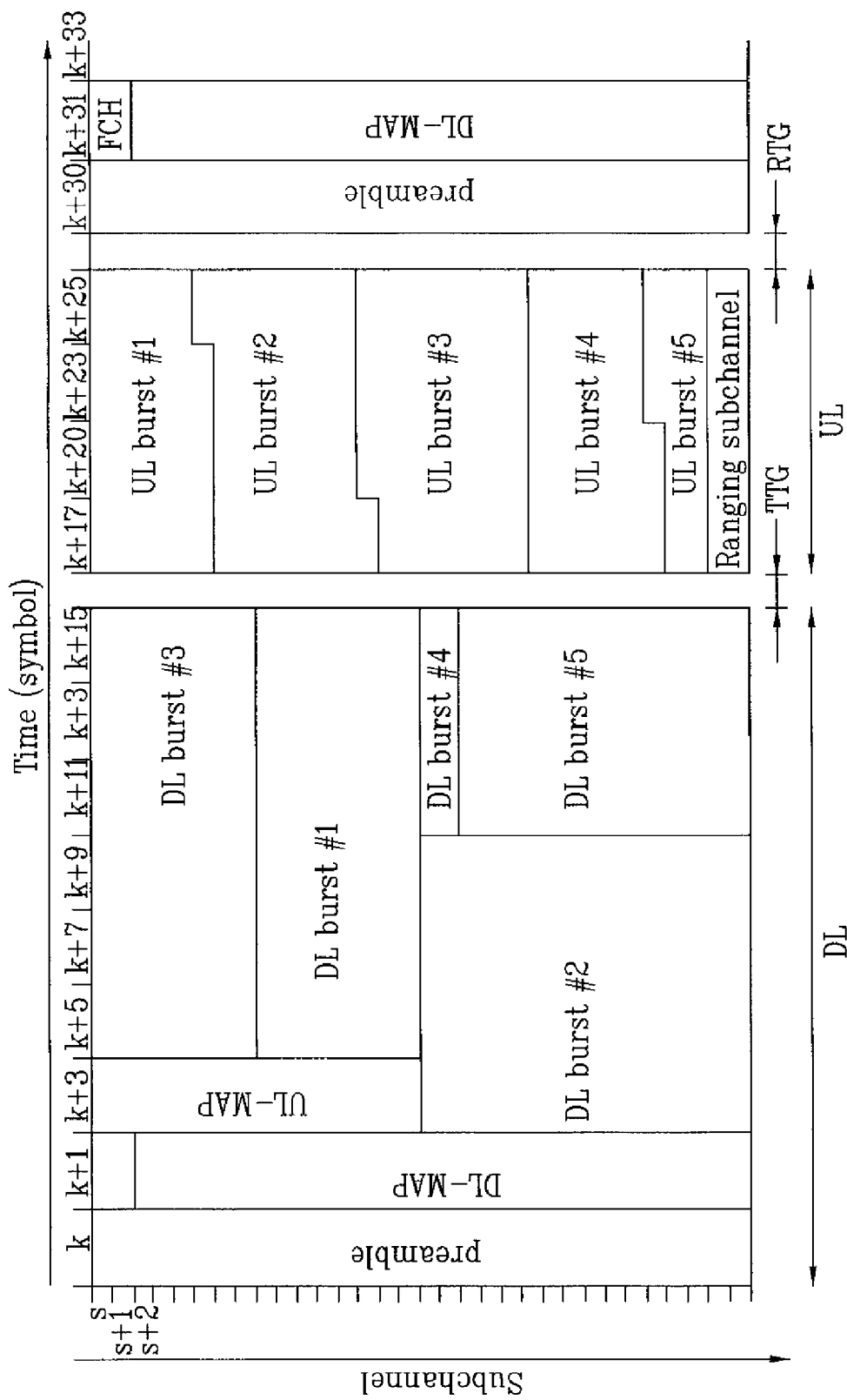
FIG. 7 illustrates a data frame in an orthogonal frequency division multiplexing access (OFDMA) radio communication system in accordance with the related art.
Figure 8:
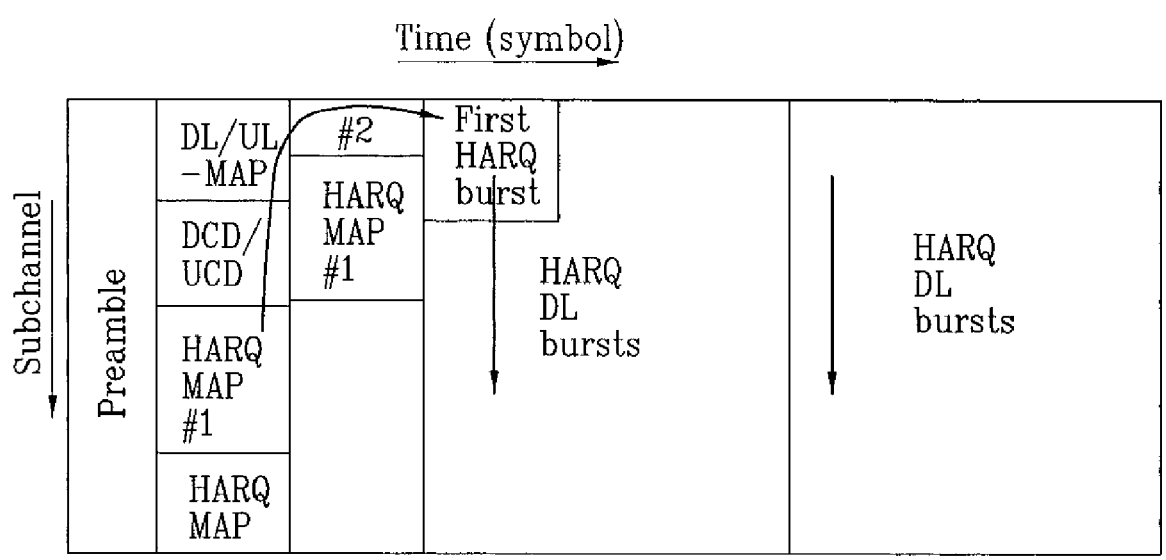
FIG. 8 illustrates a data frame allocating an HARQ burst in accordance with the related art.
Figure 9:
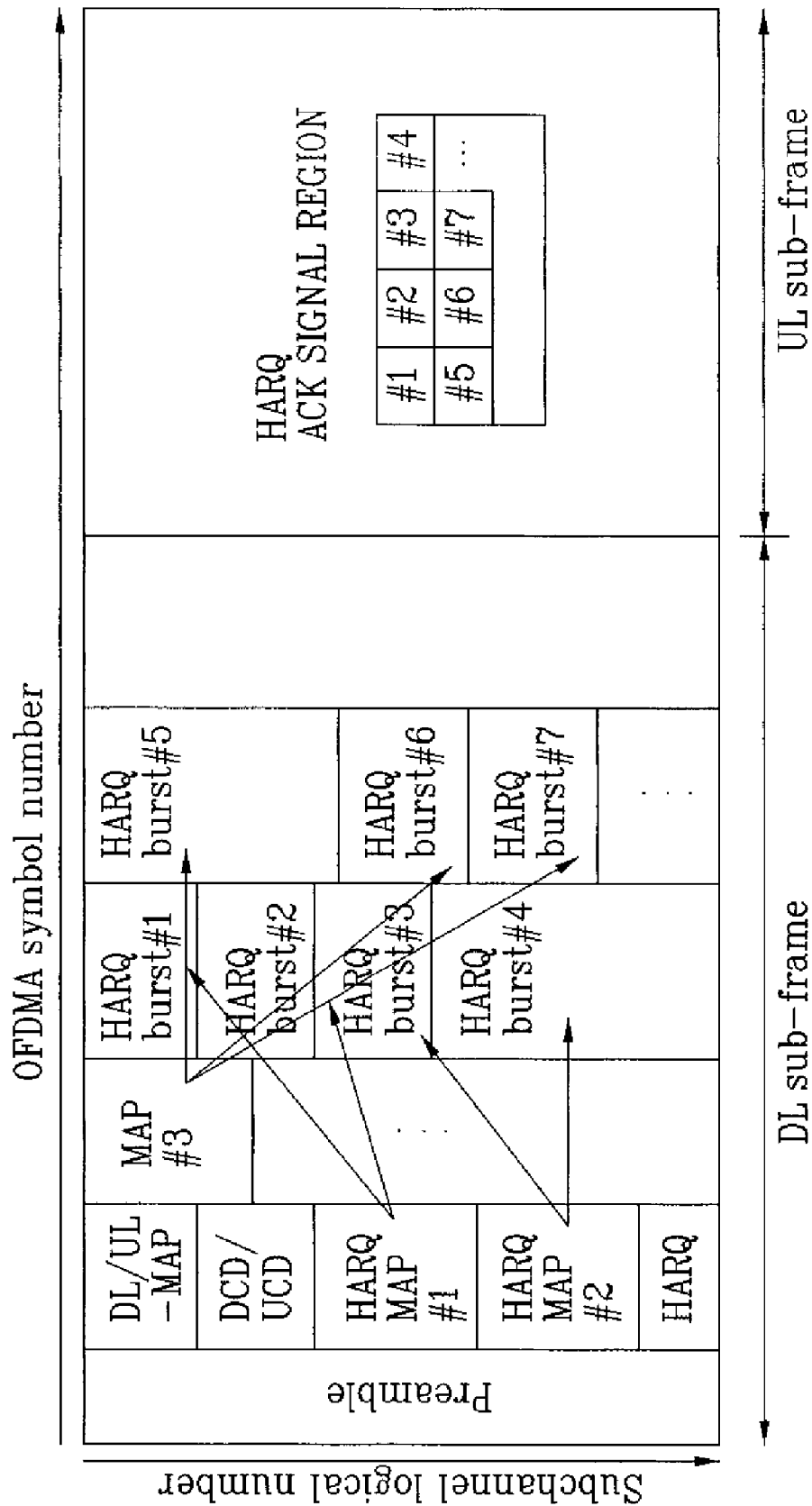
FIG. 9 illustrates a method for allocating an HARQ signal region in an HARQ MAP message in accordance with the related art.
Figure 10:
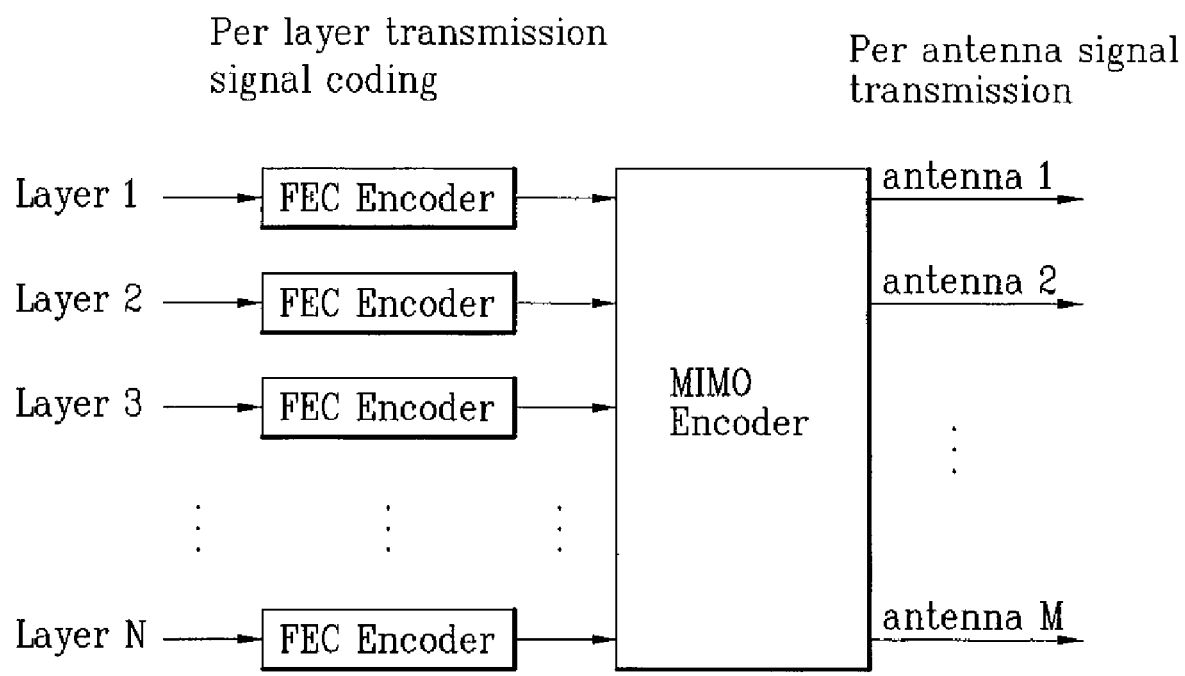
FIG. 10 illustrates an encoding method per layer in accordance with the related art.

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art. Preferably, the present invention may be embodied in a mobile communication device comprising the processor described above along with a plurality of antennas and channel encoders, as depicted in FIG. 10, and the components described in FIG. 6.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting packet data in a wireless communication system configured to support multiple input and multiple output, the method comprising:

receiving data comprising a plurality of data map information elements and at least one data burst comprising a plurality of layers, wherein each of the plurality of layers is encoded with a corresponding channel encoder, and wherein one of the data map information elements is configured to provide control information associated with each one of the plurality of layers, wherein the control information for each one of the plurality of layers comprises traffic interval usage code, a hybrid automatic retransmission request (HARQ) channel identifier (ACID), a HARQ ID sequence number (ASN), and wherein another one of the data map information elements is configured to provide an uplink acknowledgement (ACK) channel region, wherein an acknowledgement status of each of the plurality of layers is allocated to its associated acknowledgement channel in an uplink data frame; and transmitting in an uplink ACK channel a plurality of acknowledgement statuses, each of the plurality of acknowledgement statuses being associated with whether a downlink packet of a corresponding one of the plurality of layers is properly decoded, wherein a half subchannel is used for each of the plurality of acknowledgement statuses, and each of the acknowledgement statuses is represented by 24 subcarriers of the half subchannel.

2. The method of claim 1, wherein the 24 subcarriers comprise a combination of 3 modulation symbol groups, the 3 modulation symbol groups selected from group sets G0-G7 set out in a table as follows:

| Group set | Signal of 8-subcarriers to be transmitted |
|---|---|
| G0 | P0, P1, P2, P3, P0, P1, P2, P3 |
| G1 | P0, P3, P2, P1, P0, P3, P2, P1 |
| G2 | P0, P0, P1, P1, P2, P2, P3, P3 |
| G3 | P0, P0, P3, P3, P2, P2, P1, P1 |
| G4 | P0, P0, P0, P0, P0, P0, P0, P0 |
| G5 | P0, P2, P0, P2, P0, P2, P0, P2 |
| G6 | P0, P2, P0, P2, P2, P0, P2, P0 |
| G7 | P0, P2, P2, P0, P2, P0, P0, P2. |

3. The method of claim 1, wherein the channel encoder comprises a forward error encoder.

4. The method of claim 1, wherein each of the plurality of data map information elements comprises a HARQ map information element.

5. The method of claim 1, wherein each of the plurality of data map information elements is one of an uplink map information element or a downlink map information element.

6. A wireless communication apparatus for transmitting packet data, the apparatus comprising:

receiving unit for receiving data comprising a plurality of data map information elements and at least one data burst comprising a plurality of layers, wherein each of the plurality of layers is encoded with a corresponding channel encoder, and wherein one of the data map information elements is configured to provide control information associated with each one of the plurality of layers, wherein the control information for each one of the plurality of layers comprises traffic interval usage code, a hybrid automatic retransmission request (HARQ) channel identifier (ACID), a HARQ ID sequence number (ASN), and wherein another one of the data map information elements is configured to provide an uplink acknowledgement (ACK) channel region, wherein an acknowledgement status of each of the plurality of layers is allocated to its associated acknowledgement channel in an uplink data frame; and transmitting unit for transmitting in an uplink ACK channel a plurality of acknowledgement statuses, each of the plurality of acknowledgement statuses being associated with whether a downlink packet of a corresponding one of the plurality of layers is properly decoded, wherein a half subchannel is used for each of the plurality of acknowledgement statuses, and each of the acknowledgement statuses is represented by 24 subcarriers of the half subchannel.

7. The apparatus of claim 6, wherein the 24 subcarriers comprise a combination of 3 modulation symbol groups, the 3 modulation symbol groups selected from group sets G0-G7 set out in a table as follows:

| Group set | Signal of 8-subcarriers to be transmitted |
|---|---|
| G0 | P0, P1, P2, P3, P0, P1, P2, P3 |
| G1 | P0, P3, P2, P1, P0, P3, P2, P1 |
| G2 | P0, P0, P1, P1, P2, P2, P3, P3 |
| G3 | P0, P0, P3, P3, P2, P2, P1, P1 |
| G4 | P0, P0, P0, P0, P0, P0, P0, P0 |
| G5 | P0, P2, P0, P2, P0, P2, P0, P2 |
| G6 | P0, P2, P0, P2, P2, P0, P2, P0 |
| G7 | P0, P2, P2, P0, P2, P0, P0, P2. |

8. The apparatus of claim 6, wherein the channel encoder comprises a forward error encoder.

9. The apparatus of claim 6, wherein each of the plurality of data map information elements comprises a HARQ map information element.

10. The apparatus of claim 6, wherein each of the plurality of data map information elements is one of an uplink map information element or a downlink map information element.

* * * * *